(12) United States Patent
Gibbs

(10) Patent No.: US 11,048,609 B2
(45) Date of Patent: Jun. 29, 2021

(54) COMMIT WINDOW MOVE ELEMENT

(71) Applicant: Arm Limited, Cambridge (GB)

(72) Inventor: Michael John Gibbs, Fulbourn (GB)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 16/645,584

(22) PCT Filed: Dec. 10, 2018

(86) PCT No.: PCT/GB2018/053575
§ 371 (c)(1),
(2) Date: Mar. 9, 2020

(87) PCT Pub. No.: WO2019/145668
PCT Pub. Date: Aug. 1, 2019

(65) Prior Publication Data
US 2020/0264963 A1  Aug. 20, 2020

(30) Foreign Application Priority Data
Jan. 25, 2018 (GB) .................................. 1801246

(51) Int. Cl.
*G06F 9/30* (2018.01)
*G06F 11/34* (2006.01)
*G06F 9/38* (2018.01)
*G06F 11/30* (2006.01)
*G06F 11/36* (2006.01)

(52) U.S. Cl.
CPC ........ *G06F 11/348* (2013.01); *G06F 9/30043* (2013.01); *G06F 9/3842* (2013.01); *G06F 11/3024* (2013.01); *G06F 11/3636* (2013.01)

(58) Field of Classification Search
CPC .................................................. G06F 9/30043
See application file for complete search history.

(56) References Cited

U.S. PATENT DOCUMENTS

| | | | |
|---|---|---|---|
| 2008/0065864 A1* | 3/2008 | Akkary | G06F 9/3004 712/225 |
| 2011/0314264 A1 | 12/2011 | Horley et al. | |
| 2011/0314342 A1 | 12/2011 | Gilkerson et al. | |

FOREIGN PATENT DOCUMENTS

WO   2016/139446   9/2016

OTHER PUBLICATIONS

Search Report for GB Application No. 1801246.8 dated Jul. 30, 2018, 4 pages.
International Search Report and Written Opinion of the ISA for PCT/GB2018/053575 dated Mar. 15, 2019, 13 pages.

\* cited by examiner

*Primary Examiner* — Michael J Metzger
(74) *Attorney, Agent, or Firm* — Nixon & Vanderhye P.C.

(57) ABSTRACT

A trace module has monitoring circuitry for monitoring processing of instructions by processing circuitry, and trace output circuitry for outputting a sequence of elements indicative of outcomes of the processing of instructions by the processing circuitry. The trace module supports output of a commit window move element indicating that a commit window, representing a portion of the trace stream comprising at least one speculative element representing at least one speculatively executed instruction, should move while the oldest remaining speculative element of the trace stream remains uncommitted. This can be useful for tracing of transactional memory functionality within program code.

19 Claims, 10 Drawing Sheets

| element type | meaning |
|---|---|
| E | P0 element, indicates one or more instructions were executed (speculatively or non-speculatively), if branch indicates branch predicted taken |
| N | P0 element, indicates one or more instructions were executed and branch predicted not taken |
| Commit (X) | $0 < X \leq$ max speculation depth<br>speculative instructions represented by oldest X speculative elements of commit window were committed by the processing circuitry, move start of commit window to after the committed elements |
| Cancel (X) | $0 < X \leq$ max speculation depth<br>speculative instructions represented by youngest X speculative elements of commit window were cancelled by the processing circuitry |
| Commit Window Move (X) | $0 \leq X \leq$ max speculation depth<br>$X = 0$ (commit window reset) : move start of commit window to oldest remaining speculative element of sequence<br><br>$X > 0$ : move start of commit window to $X^{th}$ speculative element following oldest remaining speculative element, while oldest remaining speculative element remains uncommitted |
| Mispredict | previous N/E element was mispredicted |

FIG. 2

| PE execution | | Trace elements | Notes |
|---|---|---|---|
| 0x1000 | B -> 0x2000 | trace_info_element(...) trace_on_element() context_element(...) address_element(0x1000) atom_element(E) | The instruction executed is a taken branch, so the trace unit generates an E Atom element. |
| 0x2000 | MOV | - | None of these instructions are traced as P0 elements, therefore no trace elements are generated. |
| 0x2004 | LDR | - | |
| 0x2008 | CMP | - | |
| 0x200C | BEQ -> 0x3000 (not taken) | atom_element(N) | This branch is not taken, so the trace unit generates an N Atom element. The N Atom element implies the execution of the three previous instructions and the BEQ instruction. |
| 0x2010 | STR | - | This instruction is not traced as a P0 element, therefore no trace element is generated. |
| - | IRQ | exception_element(IRQ, 0x2014) | An IRQ occurs. The Exception element indicates the STR instruction was executed. |
| - | commit all execution | commit_element(3) | This commits the two Atom elements generated for the branch instructions at 0x1000 and 0x200C, plus the Exception element generated for the IRQ exception. |

FIG. 3

| PE execution | | Trace elements | Notes |
|---|---|---|---|
| 0x1000 | B -> 0x2000 | trace_info_element(...) trace_on_element() context_element(...) address_element(0x1000) atom_element(E) | The instruction executed is a taken branch, so the trace unit generates an E Atom element. |
| 0x2000 | MOV | - | None of these instructions are traced as P0 elements, therefore no trace elements are generated. |
| 0x2004 | LDR | - | |
| 0x2008 | CMP | - | |
| 0x200C | BEQ -> 0x3000 (not taken) | atom_element(N) | This branch is not taken, so the trace unit generates an N Atom element. The N Atom element implies the execution of the three previous instructions and the BEQ instruction. |
| 0x2010 | STR | - | This instruction is not traced as a P0 element, therefore no trace element is generated. |
| 0x2014 | B -> 0x4000 | atom_element(E) | This branch is taken, so the trace unit generates an E Atom element. The E Atom element implies the execution of the previous STR instruction and the B instruction. |
| - | BEQ at 0x200C is mispredicted | cancel_element(1) mispredict_element() | The cancel element cancels the E Atom element that was generated for the branch at 0x2014. The trace analyzer discards the E Atom element, plus the STR instruction that it implied.<br>Because the PE mispredicted the outcome of the conditional branch instruction at 0x200C, the trace unit generates a Mispredict element to signal to the trace analyzer that the N Atom element that was generated has now changed to an E Atom element. |
| 0x3000 | MOV | - | This instruction is not traced as a P0 element, therefore no trace element is generated. |
| 0x3004 | B -> 0x5000 | atom_element(E) | This branch is taken, so the trace unit generates an E Atom element. The E Atom element implies the execution of the previous MOV instruction. |
| - | All instructions now committed | commit_element(3) | This commits the Atom elements generated for the three branch instructions at 0x1000, 0x200C, and 0x3004. |

FIG. 4

| Address | PE execution | Trace elements | Overall speculation depth 50 | Commit window speculation depth 51 | Oldest remaining speculative element 70 | Oldest element of commit window 52 |
|---|---|---|---|---|---|---|
| 0x1000 | TSTART | trace_info_element(...) | | | | |
| | | trace_on_element() | | | | |
| | | context_element(...) | | | | |
| | | address_element(0x1000) | | | | |
| | | atom_element(E) | | | | |
| | | CWM(1) | 1 | 1 | E at 0x1000 | E at 0x1000 |
| 0x2000 | MOV | - | 1 | 0 | E at 0x1000 | next element to be generated |
| 0x2004 | LDR | - | 1 | 0 | E at 0x1000 | next element to be generated |
| 0x2008 | CMP | - | 1 | 0 | E at 0x1000 | next element to be generated |
| 0x200C | BEQ -> 0x3000 (not taken) | atom_element(N) | 2 | 1 | E at 0x1000 | N at 0x200C |
| ... | | ... | ... | | ... | ... |
| 0x2014 | B -> 0x4000 (taken) | atom_element(E) | 3 | 2 | E at 0x1000 | N at 0x200C |
| 0x4000 | LDR | - | 3 | 2 | E at 0x1000 | N at 0x200C |
| 0x4004 | CMP | - | 3 | 2 | E at 0x1000 | N at 0x200C |
| 0x4008 | BNE -> 0x6000 (not taken) | atom_element(N) | 4 | 3 | E at 0x1000 | N at 0x200C |
| - | commit BEQ at address 0x200C | - | 4 | 3 | E at 0x1000 | N at 0x200C |
| 0x400C | BEQ -> 0x8000 (taken) | atom_element(E) | 4 | 3 | E at 0x1000 | E at 0x2014 |
| 0x8000 | ADD | - | 4 | 3 | E at 0x1000 | E at 0x2014 |
| 0x9000 | TCOMMIT | CWM(0) | 4 | 4 | E at 0x1000 | E at 0x1000 |
| | | Commit(1) | 3 | 3 | E at 0x2014 | E at 0x2014 |
| | commit all execution | Commit(3) | 0 | 0 | - | - |

FIG. 9

COMMIT WINDOW MOVE ELEMENT

This application is the U.S. national phase of International Application No. PCT/GB2018/053575 filed Dec. 10, 2018 which designated the U.S. and claims priority to GB Patent Application No. 1801246.8 filed Jan. 25, 2018, the entire contents of each of which are hereby incorporated by reference.

The present technique relates to the field of data processing. More particularly, it relates to the generation and analysis of trace data indicative of outcomes of processing of instructions by processing circuitry.

A data processing apparatus may have a trace module for monitoring processing of instructions by processing circuitry and outputting a sequence of elements which indicates outcomes of the processing instructions by the processing circuitry. For example, the trace elements generated by the trace module may indicate processing behaviour such as the outcomes of branch instructions, occurrence of exceptions, or occurrence of other events of interest arising during processing of the instructions by the processing circuitry. A trace analysis unit can analyse the sequence of elements that were output by the trace module and reconstruct what operations were performed by the processing circuitry when a given programme was executed. This can be useful for debugging or diagnostic purposes, for example for assisting with software development or for performance analysis.

At least some examples provide a trace module comprising:
   monitoring circuitry to monitor processing of instructions by processing circuitry; and
   trace output circuitry to output a sequence of elements indicative of outcomes of the processing of the instructions by the processing circuitry; in which:
   the trace output circuitry is capable of outputting:
   a commit element indicative of the processing circuitry having committed one or more speculatively executed instructions represented by at least one oldest speculative element in a commit window of the sequence of elements, the commit window comprising a portion of the sequence of elements comprising at least one speculative element representing at least one speculatively executed instruction which is still to be committed by the processing circuitry, where the commit element is also indicative that following the commit element said at least one oldest speculative element is to be excluded from the commit window; and
   a commit window move element indicative that, while one or more speculatively executed instructions represented by an oldest remaining speculative element of the sequence of elements remain uncommitted by the processing circuitry, the commit window should move relative to the oldest remaining speculative element to change which speculative element is the oldest speculative element of the commit window.

At least some examples provide a data processing apparatus comprising the trace module as described above, and the processing circuitry.

At least some examples provide a method for tracing processing of instructions by processing circuitry, comprising:
   monitoring processing of the instructions by the processing circuitry; and
   outputting a sequence of elements indicative of outcomes of the processing of the instructions by the processing circuitry;
   the sequence of elements including:
   a commit element indicative of the processing circuitry having committed one or more speculatively executed instructions represented by at least one oldest speculative element in a commit window of the sequence of elements, the commit window comprising a portion of the sequence of elements comprising at least one speculative element representing at least one speculatively executed instruction which is still to be committed by the processing circuitry, where the commit element is also indicative that following the commit element said at least one oldest speculative element is to be excluded from the commit window; and
   a commit window move element indicative that, while one or more speculatively executed instructions represented by an oldest remaining speculative element of the sequence of elements remain uncommitted by the processing circuitry, the commit window should move relative to the oldest remaining speculative element to change which speculative element is the oldest speculative element of the commit window.

At least some examples provide a trace analysis method comprising:
   obtaining a sequence of elements indicative of outcomes of processing of instructions by target processing circuitry;
   in response to detecting a commit element in the sequence of elements:
      deducing that the target processing circuitry committed one or more speculatively executed instructions represented by at least one oldest speculative element in a commit window of the sequence of elements, the commit window comprising a portion of the sequence of elements comprising at least one speculative element representing at least one speculatively executed instruction which is still to be deduced as committed by the target processing circuitry, and
      excluding said at least one oldest speculative element from the commit window for the analysis of subsequent elements of the sequence of elements; and
   in response to detecting a commit window move element in the sequence of elements, moving the commit window relative to an oldest remaining speculative element of the sequence of elements to change which speculative element is the oldest speculative element of the commit window, while the oldest remaining speculative element remains still to be deduced as committed by the target processing circuitry.

A computer program may be provided for controlling a data processing apparatus to perform the trace analysis method described above. A storage medium may store the computer program. The storage medium may be a non-transitory storage medium.

At least some examples may provide an apparatus comprising host processing circuitry, and storage circuitry to store a computer program for controlling host processing circuitry to perform the trace analysis method performed above.

At least some examples may provide a trace analyser comprising:
   a trace input to obtain a sequence of elements indicative of outcomes of processing of instructions by target processing circuitry; and
   trace analysis circuitry responsive to detection of a commit element in the sequence of elements, to deduce that the target processing circuitry committed one or more speculatively executed instructions represented by at least one oldest speculative element in a commit window of the sequence of elements, the commit window comprising a portion of the sequence of elements comprising at least one speculative element representing at least one speculatively executed instruction which is still to be deduced as committed by the target processing circuitry, and to exclude said at least one oldest speculative element from the commit window for the analysis of subsequent elements of the sequence of elements;

in which in response to detecting a commit window move element in the sequence of elements, the trace analysis circuitry is configured to move the commit window relative to an oldest remaining speculative element of the sequence of elements to change which speculative element is the oldest speculative element of the commit window, while the oldest remaining speculative element remains still to be deduced as committed by the target processing circuitry.

Further aspects, features and advantages of the present technique will be apparent from the following description of examples, which is to be read in conjunction with the accompanying drawings, in which:

FIG. 2 is a table showing a subset of the types of trace elements that can be generated by the trace module;

FIGS. 3 and 4 show examples of tracing of speculatively executed instructions using commit and cancel elements;

FIG. 9 shows an example of generating the commit window move element in response to a transaction start instruction;

Figure 1:
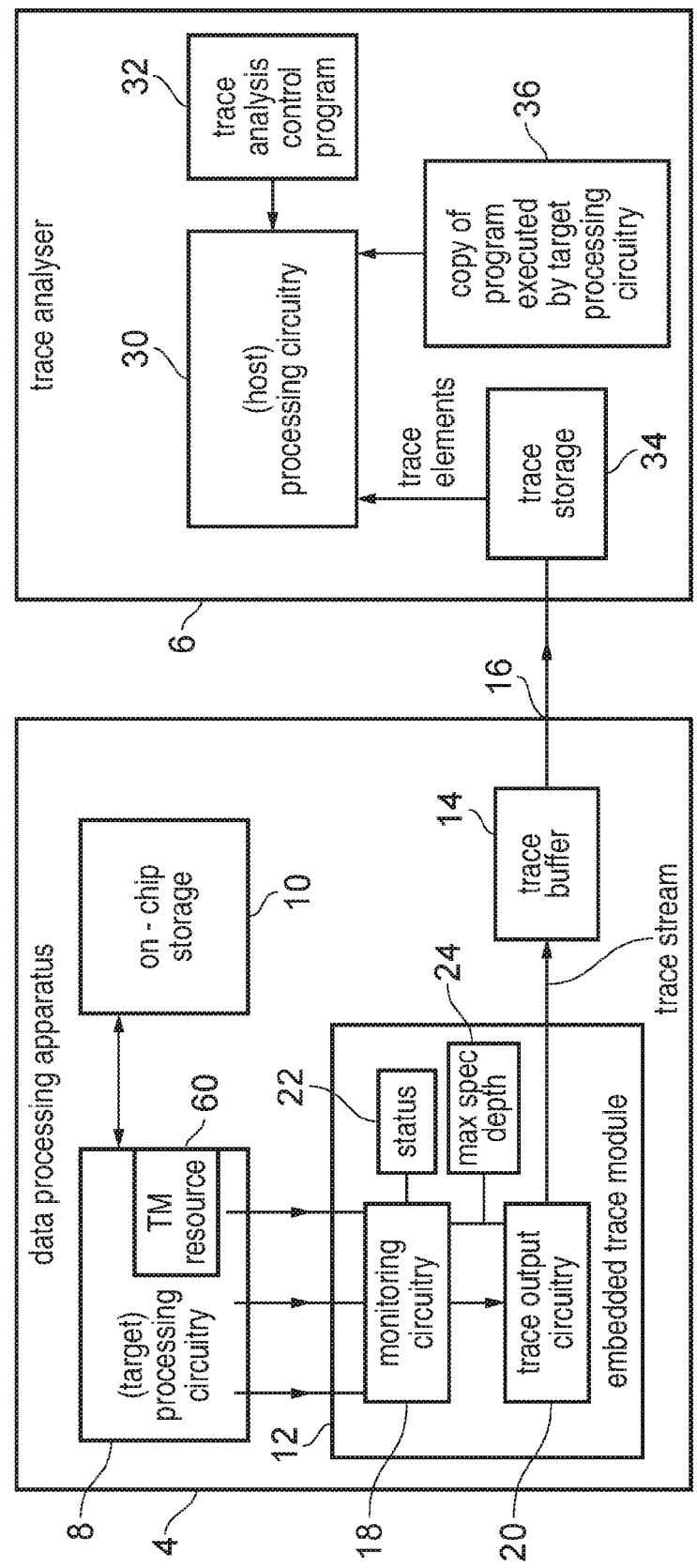
FIG. 1 shows an example of a data processing apparatus having a trace module for generating a sequence of trace data elements indicating properties of processing performed by processing circuitry, and a trace analyser for analysing the trace data generated by the trace module.

A data processing apparatus may support speculative execution of instructions, in which the instructions are executed before it is actually known whether the instructions should have been executed or whether the data inputs to the instruction are valid. For example, the apparatus may have a branch predictor for predicting the outcomes of branch instructions, and following a prediction of a given branch instruction subsequent instructions may be executed speculatively assuming the prediction is correct. Later once the branch instruction is actually executed the real outcome of the branch may be determined and if the prediction was correct then the subsequent speculatively executed instructions may be committed so that their results are treated as valid. If the prediction was incorrect, then the speculatively executed instructions may have their effects cancelled to rewind state back to the state that was present when the branch was executed and then commence executing a different path of instructions within the program being executed. Other reasons for speculative execution may include, for example, data speculation, where the data value of a load instruction to be loaded from memory may be predicted before the load has actually been carried out, to enable subsequent instructions to be executed before the load is complete. Also, as will be discussed below, some apparatuses may support transactional memory which may introduce speculative execution of instructions within a transaction.

A trace module may comprise monitoring circuitry for monitoring processing of instructions by processing circuitry, and trace output circuitry for outputting a sequence of elements indicating outcomes of processing of the instructions by the processing circuitry. In such a trace module, speculative execution of the instructions can pose challenges for efficiently representing the outcome of the executed instructions in the sequence of elements that are output by the trace module. The resources for buffering trace elements on-chip before they are output can often be limited, and so it may not be practical to hold back the output of trace elements until it is known that a speculatively known instruction should definitely be committed. It may be simpler for the trace output circuitry to output elements which indicate the outcomes of speculatively executed instructions regardless of whether the speculation was correct, and then to include additional elements in the trace stream which indicate whether previously output element speculative elements relate to committed or cancelled instructions.

Hence, the trace output circuitry may support output of a commit element which indicates that the processing circuitry committed one or more speculatively executed instructions represented by at least one oldest speculative element in a commit window of the sequence of elements. The commit window represents a portion of the sequence of elements which includes at least one speculative element representing at least one speculatively executed instruction which is still to be committed by the processing circuitry. The commit element may also indicate that once the commit element has been seen by the trace analyser then the at least one oldest speculative element should be excluded from the commit window. Hence, the commit window moves forward within the trace streams so the commit window no longer includes the element related to committed instructions. Supporting such a commit element enables the trace module to simply output the elements relating to executed instructions regardless of whether they are speculative, but then resolve the outcome of previously output speculative elements by outputting a commit element once an instruction has been committed. This approach avoids the need to buffer up elements within the trace module until the corresponding instructions have been committed, saving on-chip trace resource.

However, the inventor recognised that increasingly there are forms of speculation supported by modern processing apparatuses which make tracing of speculative execution more complex. Some types of speculation, such as transactional memory or long-latency load/store operations, may remain speculative for a long time while a number of younger instructions are speculatively executed and resolved before the previous speculation has been resolved. This type of speculation can be difficult to trace with only a commit element which represents commitment of the oldest element of the commit window. In practice, this may often limit the effectiveness of the trace information which can be generated for processing circuitry supporting such long lived speculation events.

In the technique discussed below, the trace module also supports a commit window move element which indicates that, while one or more speculatively executed instructions represented by an oldest remaining speculative element of the sequence of elements remain uncommitted by the processing circuitry, the commit window should move relative to the oldest remaining speculative element to change which speculative element is the oldest speculative element of the commit window. Hence, output of the commit window move element enables the start of the commit window to be moved within the sequence of instructions so that a subsequent commit element would no longer be restricted to committing the very oldest remaining speculative element, but could represent the commitment of a later element in the sequence, while the oldest remaining speculative element remains speculative and uncommitted. This can be very useful for tracing sequences of instructions which use transactional memory or long-latency load store operations for example. It may seem counter-intuitive that it would be useful to move the start of the commit window without actually committing the oldest remaining speculative element, as normally one would expect that the processing circuitry would need to resolve the outcome of the oldest remaining speculative element before committing any younger elements. However, with functionality such as transactional memory, it may be possible for younger branches or other speculative instructions to be resolved before the transaction as a whole may be committed. Similarly, with long-latency loads, a younger speculative instruction may be resolved before the load has been resolved. Hence the commit window move element can be used for enabling better diagnostic information to be provided for assessing the execution of such program code. For example, in the event of a misspeculation (such as an aborted transaction) this can help to provide diagnostic information on how far past the speculation the processor reached within the program code before the misspeculation was identified. For example, for transaction memory this can be useful in diagnosing possible reasons for loss of performance in execution of transaction code.

The trace output circuitry does not need to output the commit element every time an instruction which was speculatively executed is committed by the processing circuitry. In some examples, in response to the processing circuitry committing one or more speculatively executed instructions represented by at least one older speculative element in the commit window, the trace module may determine whether a number of speculative elements in the commit window is less than a maximum speculation depth. The maximum speculation depth may be a parameter which could be hardwired for a given trace module or could be programmable within a register. The maximum speculation depth may be set to correspond with a maximum number of different speculation points which may remain speculative at a time by the processing circuitry (which could be a parameter of the micro-architectural design of a given processor core for example). Hence a system designer may define the maximum speculation depth for the trace module based on knowledge of the particular processing circuitry with which that trace module is to be used.

When the processing circuitry is detected as having committed one or more instructions, the number of speculative elements in the commit window is less than the maximum speculative depth, the trace output circuitry may output the commit element to indicate that one or more speculative elements corresponding to those instructions have been committed. However, when the number of speculative elements in the commit window equals the maximum speculation depth, then even though one or more speculatively executed instructions represented by the oldest one or more elements of the commit window have been committed, the trace output circuitry may suppress output of the commit element. This can be useful for saving trace bandwidth by reducing the number of trace elements which are output by the trace module. Typically, the processing circuitry may be limited in how many speculation points can be pending at one time, for example limited by the number of entries in a buffer for buffering information on the speculation points to enable restoration of previous states when instructions are cancelled. Hence, when the maximum speculation depth has been reached then it may be assumed that if any further elements relating to speculatively executed instructions are output by the trace module, then implicitly the instructions corresponding to the oldest speculative element would already have been committed, and so this can be deduced by a trace analyser without needing any explicit trace element to be included in the stream of trace elements. Hence, the definition of a maximum speculation depth can be useful to reduce the number of commit elements that need to be output.

Trace module support for the commit window move element can be particularly useful for trace modules which use such a maximum speculation depth to limit when commit elements need to be output. Consider tracing of a sequence of program code in which an initial speculation point remains speculative for a very long time and then a number of younger speculation points which occurred after that speculation point are executed speculatively and resolved before the oldest speculation point has been resolved. Without support for the commit window move element, to be able to fully trace the outcome of each speculation point the maximum speculation depth may need to be set to be relatively large. This is a particularly a problem for code involving transactional memory, where a transaction may include a potentially infinite number of instructions which may include a large number of branches or other speculation decision points, and so fully tracing the behaviour of that code may require a relatively large number of speculative elements to be output after the start of the transaction before the transaction as a whole is resolved.

One approach to tracing such program code could be to make the maximum speculation depth large so that the commit window can continue to increase in size as further speculation points are reached, without needing to commit the oldest element. However this would decrease efficiency of the trace module when tracing code not using a transaction, as increasing the maximum speculation depth would make it more common that, when instructions are committed, the maximum speculation depth has not been reached yet and so a commit element would be needed. This can increase the amount of trace data which is generated and hence leads to less efficient use of resource such as space in an on-chip trace buffer for buffering the generated trace elements output by the trace output circuitry before they are read from the trace buffer by an off-chip trace analyser.

Another approach (in the absence of support for the commit window move element) could be to keep the maximum speculation depth smaller, but in this case once the maximum speculation depth has been reached, if the transaction as a whole cannot yet be committed, it would not be possible to output any further speculative elements in response to branches or other speculation points of the transaction, as the commit elements act on the oldest remaining element of the commit window. If no elements are output regarding later speculative events of the transaction, this may prevent a trace analyser being able to deduce any information about the later instructions of the transaction. For example, if a transaction is aborted, if the abort occurred after the last speculative element output before the maximum speculation depth was reached, the trace stream may not contain any information which would enable the trace analyser being able to deduce how much further the processing circuitry was able to proceed through the transaction before the abort occurred, which can make deducing the timing of the abort (and hence the potential cause) much more difficult.

In contrast, by using the commit window move element as discussed above, the start of the commit window buffer can be moved forward without needing to actually the oldest remaining speculative element of the entire sequence of elements, so that the next commit element can indicate that a younger element has been committed without committing the oldest remaining speculative element. This avoids the need to greatly increase the maximum speculation depth in order to handle commitment of younger instructions following an event which may remain speculative for a long time, so that overall the available trace bandwidth can be used more efficiently, while still providing diagnostic information on each speculative event following the long-lived speculative event.

Note that the term "oldest remaining speculative element" of the sequence of elements refers to the very oldest speculative element in the sequence of elements generated by the trace output circuitry as a whole. That is, the oldest remaining speculative element is the previously output element that relates to the oldest instruction still to be committed or cancelled by the processing circuitry (or from the point of view of the trace analyser, the oldest remaining speculative element relates to the oldest instruction still to be deduced by the trace analyser as having been committed by the processing circuitry when the target program was executed). On the other hand, the "oldest speculative element" in the commit window refers to the oldest element in the specific portion of the trace sequence that corresponds to the commit window, which may or may not be the same as the oldest remaining speculative element in the sequence of elements as a whole. When a commit window move element has been included in the trace stream, then the start of the commit window may be later than the oldest remaining speculative element, and so in this case the oldest speculative element of the commit window may not be the same as the oldest remaining speculative element of the sequence of elements.

In some implementations, the number of elements by which the commit window should be moved when the commit window move element is output may be fixed. For example, a default amount (e.g. moving the commit window by one element) could be assumed.

However, in other implementations the commit window move element may indicate a window start indicator which is indicative of the speculative element which should become the oldest speculative element of the commit window following the change in position of the commit window indicated by the commit window move element. This can help to reduce the number of trace elements to be generated, since if the commit window needs to move by more than one element than a single commit window element can be output specifying the point in the trace stream to which the commit window should move, i.e. which speculative element should now become the oldest speculative element of the commit window. The window start indicator of the commit window move element can be expressed in different ways, e.g. relative to the oldest remaining speculative element of the sequence of elements, relative to the most recently output trace element of the sequence of elements, or relative to the oldest speculative element of the commit window.

However in one example a window start indicator identifies a number of speculative elements, including the oldest remaining speculative element of the sequence of elements, which are to be older than the oldest speculative element of the commit window after the change in position of the commit window indicated by the commit window move element has been carried out. That is, the window start indicator may effectively indicate the offset of the start of the commit window relative to the start of the oldest remaining speculative element of the sequence of elements as a whole.

The commit window move element could be output by the trace output circuitry at different timings. Different trace implementations may choose different points at which it may be useful to output such a commit window move element. Hence, it is useful for a trace architecture in general to support the output window move element in order to enable more efficient tracing of transactional memory or other code which includes relatively long lived speculation events, but the precise timing at which the commit window move element may be a matter for the specific system implementation being implemented.

Nevertheless, in some examples, it may be useful to output the commit window move element in response to the monitoring circuitry of the trace module detecting that the processing circuitry has executed a transaction start instruction which represents a start of a transaction comprising one or more instructions executed between the transaction start instruction and a transaction end instruction for which effects of the instruction to the transaction are to be committed when the transaction end instruction is reached without any abort event occurring between the transaction start instruction and the transaction end instruction. In systems supporting such transactional memory, following the transactional start instruction the entire transaction may remain speculative for a potentially infinite length of time before a transaction end instruction is reached, and between the transaction end and start instructions there may be a number of other branch or other speculation points which may need to be resolved by the trace module. The use of the commit window move element enables the speculative trace element representing the transaction start instruction to remain speculative (uncommitted) for a long time even if younger branches or other speculation points are resolved, without needing to greatly increase the maximum speculation depth supported. The precise timing at which the commit window move element is output in response to execution of the transaction start instruction may vary. In some cases, the commit window move element may be output in response to the transaction start instruction itself. Alternatively, the commit window move element could be output in response to the first instruction following the transaction start instruction. The precise timing of outputting the commit window move elements may depend on the specific trace implementation being adopted (e.g. different micro-architectural implementations of the same general trace architecture could choose different options for this).

In some examples, the trace output circuitry may output the commit window move element in response to the monitoring circuitry detecting the processing circuitry executing a predetermined type of load/store instruction. The predetermined type of load/store instruction may be all load/store instructions. Alternatively, the predetermined type may comprise a subset of load/store instructions, e.g. load/store instructions expected to potentially take a long time to resolve (e.g. load multiple instructions for transferring values from memory to multiple registers, or loads from a region of memory expected to have relatively slow access times). In systems using load value speculation, the period of speculation following a load instruction may be relatively long and so it may be useful to use the commit window move element to move the start of the commit window so that the trace element representing the load/store instruction can remain speculative while subsequent commit elements may act on later elements relating to younger speculation points reached after the load store instruction was executed.

The trace output circuitry may also support output of a commit window reset element which indicates that the oldest remaining speculative element of the sequence of elements should become the oldest speculative element of the commit window. Hence, the commit window reset element may effectively indicate that the commit window should go back to the default of starting at the oldest remaining speculative element of the sequence of elements as a whole. For example this can be useful once the long-lived speculation event which caused the commit window move element to be output has been resolved. Although in some cases the commit window reset element could have a different trace element format or a different element type identifier, in some cases the commit window reset element may share a common encoding format with the commit window move element, but with a window start indicator (which indicates the point in the trace stream to which the commit window is to be moved) for the commit window reset element indicating that the oldest remaining speculative element of the sequence of elements should become the oldest speculative element of the commit window. For example, if the window start indicator indicates the commit window start position relative to the oldest remaining speculative element of the sequence as discussed above, then the commit window reset element may simply comprise a commit window move element specifying a window start indicator of zero. The commit window reset element could be output in response to a range of events. For example, the commit window reset element could be output in response to the transaction end instruction of a transaction, or in response to the processing circuitry committing the predetermined type of load/store instruction discussed above.

In addition to the commit element and the commit window move element, the trace output circuitry may also support output of a cancel element which indicates that the processing circuitry has cancelled an effect of one or more speculatively executed instructions represented by at least one youngest speculative element in the commit window. Hence, while the commit element commit the oldest element of the commit window, the cancel element acts on the youngest element(s) in the commit window. The commit element and cancel element together may be useful for handling speculation events where the number of speculation events that can be pending at once is relatively limited, such as a sequence of branches where the processing circuitry may only have a limited amount of buffer space for buffering data tracking unresolved branches. However, in systems which support transactional memory or long-latency load speculation, this may be insufficient to give full information on the resolution of subsequent speculation events, and so by introducing the commit window move element discussed above this can give better diagnostic information relating to the processing of code involving transactions or loads subject to load value prediction which take a long time to resolve.

To assist with tracking of the state of committed instructions, the monitoring circuitry of the trace module may maintain trace information which indicates at least one of: the oldest remaining speculative element of the sequence of elements, and/or the oldest speculative element of the commit window. This information could be represented in different ways, e.g. relative to some reference point in the trace stream, such as the most recently generated trace element. Hence, as further trace elements are generated the information indicating the oldest remaining speculative element of the sequence as a whole and the oldest speculative element of the commit window could be updated in order to change the relative position information even if the particular elements referenced has not changed. In other examples each element may have packet identifier and the oldest remaining speculative element and oldest speculative element of the commit window could be identified through the specific packet identifier. Hence there are a range of ways of representing the status information. Monitoring circuitry and trace output circuitry can use the status information to help decide what trace elements should be output, such as the commit window move element or commit widow reset element discussed above. The status information maintained by the monitoring circuitry could also track other information, such as the number of elements in the commit window (commit window speculation depth), which can be useful for determining whether to output commit elements based on the comparison of the commit window speculation depth with the maximum speculation depth.

In some examples, the trace output circuitry may also be capable of outputting a trace information element which indicates at least one of the oldest remaining speculative element of a sequence of elements, and/or the oldest speculative element in the commit window. For example the trace output circuitry may periodically output such a trace information element, for example after the output of a certain number of trace elements a trace information element may be output. This can be useful for guarding against potential loss of trace information from the trace sequence (e.g. if a trace buffer overflows before all the trace elements are able to be read for the trace buffer, some information may be lost). By periodically outputting information specifying the oldest remaining speculative element and the oldest speculative element of the commit window, this can enable a trace analyser to recover information on which elements have been committed after the point in the sequence at which the trace information element is output, even if not all of the preceding trace data is visible to the trace analyser.

In a corresponding way, an analysis method may be provided for analysing a sequence of elements indicative of outcomes of processing of instructions by the target processing circuitry. The sequence may be received from a trace module as discussed above. When a commit element is detected in the sequence of elements, the trace analyser may deduce that the target processing circuitry committed one or more speculatively executed instructions represented by the oldest speculative element in the commit window of the sequence of elements. Again, the commit window comprises a portion of the sequence of elements which includes at least one speculative element which is still be deduced as committed. Having deduced that one or more of the older speculative elements in the commit window were committed, then the trace analysis may also exclude the committed elements from the commit window for the analysis of subsequent elements in the sequence, i.e. the commit window may be moved forward within the trace stream. If a commit window move element is detected in the sequence of trace elements, then the trace analyser may move the commit window relative to an oldest remaining speculative element of the sequence of elements to change which speculative element is the oldest speculative element of the commit window, while the oldest remaining speculative element of the sequence as a whole still remains to be deduced as committed by the target processing circuitry. As the commit window can be moved without committing the oldest element of the trace sequence, a potentially unlimited number of subsequent events can be deduced as committed while an earlier event remains speculative, enabling more information on the processing of events past the initial speculation point to be deduced (e.g. determining how far through a transaction an abort event occurred).

FIG. 1 illustrates an example of a system 2 comprising a data processing apparatus 4 and a trace analyser 6. The data processing apparatus 4 has processing circuitry 8, which may be referred to as target processing circuitry as it is the processing circuitry which is executing the target program to be traced. The data processing apparatus 4 has on-chip storage circuitry 10 for storing the target program being executed and for storing other data or instructions. The data processing apparatus 4 has an embedded trace module 12 for monitoring operation of the processing circuitry 8 as it executes the target program and outputting a sequence of trace elements (referred to as a trace stream) for analysis by the trace analyser 6. An on-chip trace buffer 14 may temporarily buffer the output trace elements within the data processing apparatus 4. The trace analyser 6 may read the trace elements from the trace buffer 14 via a trace output port 16. The trace buffer 14 may function as a circular buffer, for example, so that when the buffer becomes full then the oldest trace element is overwritten with a newer trace element generated by the trace module 12. The trace module 12 may include monitoring circuitry 18 for monitoring the operation of the processing circuitry 8 as it executes the target program and for controlling trace output circuitry 20 to generate a corresponding sequence of trace elements which indicate properties of the processing performed by the processing circuitry 8. The embedded trace module may also have some status storage elements (e.g. registers) 22 for tracking status information relating to the trace stream, and a storage element 24 (e.g. a register) for indicating a maximum speculation depth representing the maximum number of speculative elements within a commit window, which will be discussed in more detail below.

The trace analyser 6 may be a dedicated integrated circuit for analysis of trace streams generated by the trace module, or may be a general purpose computer executing software for controlling the trace analyser. The trace analyser has host processing circuitry 30 for executing trace analysis. For example the host processing circuitry 30 may be a general CPU which executes a trace analysis control program 32, or could be a dedicated hardware circuit with logic gates for decoding the trace information. The trace stream output over the trace port 16 from the data processing apparatus may be stored within trace storage 34 (e.g. a memory) within the trace analyser 6. The trace stream is read from the storage 34 by the host processing circuitry 30, which analyses the trace elements based on a copy 36 of the target program which was executed by the target processing circuitry 8 when the trace stream was generated.

By providing a stream of trace elements indicating the behaviour of the processing circuitry while it was executing the target program, this allows the trace analyser to determine the path of program flow taken through the target program, which can be useful for pinpointing potential reasons for loss of performance or incorrect processing results. This is particularly useful for systems where the processing circuitry 8 executes the target program from on-chip storage 10, because in this case the signal paths between the on-chip storage 10 and processing circuitry 8 are not visible to the outside, so it would not be possible to diagnose behaviour of the processing circuitry 8 by observing signals on external integrated circuit pins for example. The inclusion of an on-chip trace module 12 provided in hardware to observe the operation of the processing circuitry 8 therefore provides assistance with software development and platform development for embedded systems, for example. However, when the trace stream is generated on-chip then there can be a challenge in managing the volume of trace data generated as the size of the trace buffer 14 provided on-chip may be limited and the trace output port 16 may only have a certain limited bandwidth for outputting trace data.

FIG. 2 shows a table indicating a subset of the types of trace element that can be output by the trace output circuitry 20 of the trace module 12. One way to limit the volume of trace data generated can be to not generate trace elements in response to every instruction executed by the target processing circuitry 8, but instead to generate trace elements in response to selected types of instructions referred to as "waypoint" instructions. The elements generated in response to a waypoint instruction are referred to as P0 elements, and can be of two types: E (taken) or N (not taken). The waypoint instructions may include instructions at which program flow may diverge or where the operation of the processing circuitry cannot be deduced from the target program copy 36 alone (such as branch instructions, conditional instructions or other program flow altering instructions). The waypoint instructions may also include instructions where a speculation (prediction of subsequent behaviour) is made, as it is useful to output a P0 element as a marker to represent the point of the program to which processing is rewound if the speculation was incorrect. As the trace analyser 6 has a copy of the target program 36, for non-waypoint instructions the trace analyser can assume that all instructions between two successive waypoint instructions have been executed when the P0 element corresponding to the second of these waypoint instructions is observed in the trace stream. Hence, the P0 element is output in response to a given waypoint instruction, but represents the execution of a block of one or more instructions ending with that waypoint instruction. For a branch, the E element is output by the trace module if the branch was predicted to be taken and the N element is output if the branch is predicted not taken. For waypoint instructions other than branches, an E element may be output as the P0 element.

The instructions represented by a P0 element could have been executed either speculatively or non-speculatively—the P0 element does not distinguish between speculatively or non-speculatively executed instructions. As shown in the third and fourth rows of FIG. 2, the trace module 12 may support Commit and Cancel elements for indicating whether speculatively executed instructions corresponding to a P0 element were committed or cancelled once it has been resolved whether the prediction made for the speculation was correct. The purpose of the speculation could vary, e.g. a branch prediction, load data value prediction, execution of a transaction, etc.

The commit element specifies a parameter X indicating a certain number of speculative elements of the trace stream. X is greater than 0 and less than or equal to the maximum speculation depth indicated in register 24. When a commit element is output by the trace module, this indicates that any speculative instructions represented by the oldest X speculative elements within a commit window of the trace stream have been committed by the processing circuitry, and that the start of the commit window should be moved to after those committed elements. The "oldest" elements are the elements of the commit window that were least recently output by the trace module 12, or which have the earliest position within the trace stream (conversely the "youngest" elements are the elements at the latest positions in the trace stream, which were most recently output by the trace module 12). The commit window refers to a portion of the trace stream which acts as a reference point for the trace analyser to track the speculative execution of instructions by the processing circuitry and the subsequent resolution of those speculatively executed instructions (committed or cancelled). The cancel element also specifies a parameter X which is greater than 0 and less than or equal to the maximum speculation depth. The cancel element indicates that the speculative instructions represented by the youngest X speculative elements of the commit window were cancelled by the processing circuitry (as they were executed incorrectly following an incorrect prediction). Hence, the trace module can use the commit and cancel elements to resolve the outcome of instructions represented by previously output P0 elements (or other types of trace elements), to avoid the need to retain those elements within a buffer on-chip until their speculation outcome has been resolved, saving circuit area by reducing the amount of on-chip buffer space needed.

As shown in the fifth row of FIG. 2m the trace module also supports the commit window move element (CWM element), which specifies a parameter X indicating a number of speculative elements which is greater than or equal to 0 and less than or equal to the maximum speculation depth. When X equals 0 then the CWM element is interpreted as a commit window reset element, which indicates that the trace analyser 6 should move the start of the commit window to the oldest remaining speculative element in the sequence of instructions being analysed. If X is greater than 0, then the commit window move element triggers the trace analyser 6 to move the start of the commit window to the $X^{th}$ speculative element following the oldest remaining speculative element of the trace stream, while the oldest remaining speculative element remains uncommitted. Hence the commit window move element can be used by the trace module to control which element of the trace stream would be targeted by a subsequently issued commit element, so that it is not essential for the commit element to always act on the very oldest remaining speculative element of the sequence of trace elements. This can be useful for tracing long lived speculation events, especially architectural speculation such as transaction memory.

As shown in the bottom row of FIG. 2, the trace module may also support outputting a mispredict element which indicates that a previously generated N or E element was incorrect, and so should be interpreted as indicating the opposite taken or not-taken outcome to the one that is actually indicated by the N or E element. This can be used by the trace module when a branch misprediction is detected by the processing circuitry 8.

It will be appreciated that FIG. 2 does not show all the types of elements that may be supported by the trace module. Other examples of trace element types can include:
Trace information elements which provides information on the status 22 of the trace module, such as information tracking the oldest remaining speculative element of the trace stream, the position of the commit window, or the current speculation depth. If the trace analyser 6 receives the complete trace stream generated by the trace module 12, the trace analyser 6 may deduce corresponding status information to the status information 22 recorded by the trace module 12 by analysing the output trace data. However, sometimes the trace buffer 14 may overflow before all the trace data has been read from the buffer 14 by the trace analyser 6. Including trace information elements to periodically provide a snapshot of the status information 22 enables the trace analyser 6 to reconstruct the correct processing outcomes even if not all previously generated trace data is visible to the trace analyser 6. Even if all the trace data is available, providing trace information elements also enables faster analysis of selected portions of the program by the trace analyser, as it enables the trace analyser to start analysis from a mid-point of the program without needing to process all preceding trace data of the trace stream.

A "trace on" element indicating that tracing has started.

An address elements indicating a program instruction address from which processing started when the trace was switched on, A context element indicating an execution context in which the processing circuitry 8 is executing instructions.

Exception elements indicating the occurrence of exceptions (including interrupts) during the processing of the processing circuitry 8.

It will be appreciated that other types of trace element could also be generated.

FIG. 3 shows an example of tracing execution of instructions of a program, using the commit element to track speculative execution. The left hand column indicates the instructions executed by the target processing circuitry 8. The middle column indicates the trace elements generated by the trace module 12 in response to these instructions. The notes column on the right hand side of the table provides notes indicating an explanation for the generated elements.

As shown in FIG. 3, as the processing circuitry 4 executes the instructions shown, each waypoint instruction (in this example the branches at instruction addresses 0x1000 and 0x200C) trigger output of a P0 element. Whether the P0 element is E or N depends on whether the branch was predicted taken or not taken. Note that the N element output at address 0x200C indicates that not only the BEQ instruction at address 0x200C, but also the preceding non-waypoint instructions (MOV, LDR and CMP), were executed. When the outcome of the branches has been resolved, a commit element is output. In this case, after predicting the outcomes of the branches at 0x1000 and 0x200C, an exception (IRQ) occurs, and an exception element is output specifying the address marking the point in the program at which the exception occurred. If the exception had not occurred, the elements corresponding to the branches would be committed or cancelled in response to the processing circuitry 8 determining whether the branch prediction was correct. However, as the exception interrupts the processing of the preceding instructions, even if the branch predictions were incorrect, there would be no rewinding of processor state to an earlier point because the exception has suspended the processing of the current thread of processing and instead instructions from an exception handling routine would be executed. Therefore, the exception can be regarded as effectively committing the P0 elements generated for the branch instructions at addresses 0x1000 and 0x200C can be committed. Therefore, the trace module 12 outputs a commit element specifying the number of elements to be committed as 3 (the E and N elements corresponding to the branches and the exception element corresponding to the exception).

FIG. 4 shows another example of a sequence of instructions being traced, showing use of the cancel element. The initial portion of FIG. 4 is similar to FIG. 3, but this time no exception occurs, and instead following the execution of a third branch at address 0x2014, it is determined that the branch at address 0x200C was mispredicted, so that the not-taken outcome should actually have been taken. Hence, the instructions at addresses 0)(2010 and 0x2014 should not have been executed. Therefore, the trace module 12 outputs a cancel element specifying a parameter of 1 indicating the number of elements to be cancelled. At this point the commit window corresponds to the three P0 elements (E, N, E) output for the branches at addresses 0x1000, 0x200C, 0x2014. The cancel element acts on the youngest element of the commit window, so cancels the E element output at 0x2014 to indicate that the corresponding instructions (STR, B) should not have been executed. Also, the trace module 12 outputs a mispredict element to indicate that the preceding N element for the branch at 0X200C indicates the wrong state, i.e. it should now be interpreted as an E atom element by the trace analyser. Use of the cancel and mispredict elements helps conserve trace buffer space by avoiding any need to buffer elements until they are known to be correct, which can be more efficient to provide a continuous stream of trace data being output over the trace buffer 14 and trace port 16. Once execution resumes from the target address 0x3000 of the branch BEQ at address 0x2000, eventually a commit element is output to indicate that the P0 elements generated for the branches at addresses 0x1000, 0x200C and 0x3004 have been resolved.

The trace module 12 does not need to output a commit element every time an instruction is committed. With micro-architectural speculation, the micro-architectural resources for tracking speculatively executed instructions within the processing circuitry may typically only support a certain limited number of speculation events pending at one time. For example, the processing circuitry 8 may have a buffer with a limited number of slots for buffering information identifying the rewind points to which processing state can be restored if there is a misspeculation. If all the slots have been used, then the processing circuitry 8 cannot make any more speculative predictions until the oldest speculation event has been resolved. The precise details of how the processing circuitry 8 controls such speculations may depend on the micro-architecture implementation of a given processor (rather than the instruction set architecture defining how the target program should be interpreted). Hence, once the processing circuitry reaches its maximum speculation depth, if another instruction is encountered which serves as a basis for speculation (such as a branch), then if it is executed, this may imply that the oldest remaining speculation has been committed. Therefore, it may not be necessary to explicitly in the trace stream indicate the commitment of the earliest speculation event. Therefore, the trace module may have a register 24 tracking maximum speculation depth allowed. The system designer may choose the value to use as the maximum speculation depth based on knowledge of the particular micro-architecture for which the trace module is to be used. When a block of one or more instructions are committed following resolution of a speculation, if the current speculation depth (number of outstanding speculative elements in the commit window still to be resolved) is at the maximum speculation depth, then issue of the commit element can be suppressed as when the next speculative trace element is output, this may implicitly indicate that the oldest outstanding speculative element has been committed.

Figure 5:
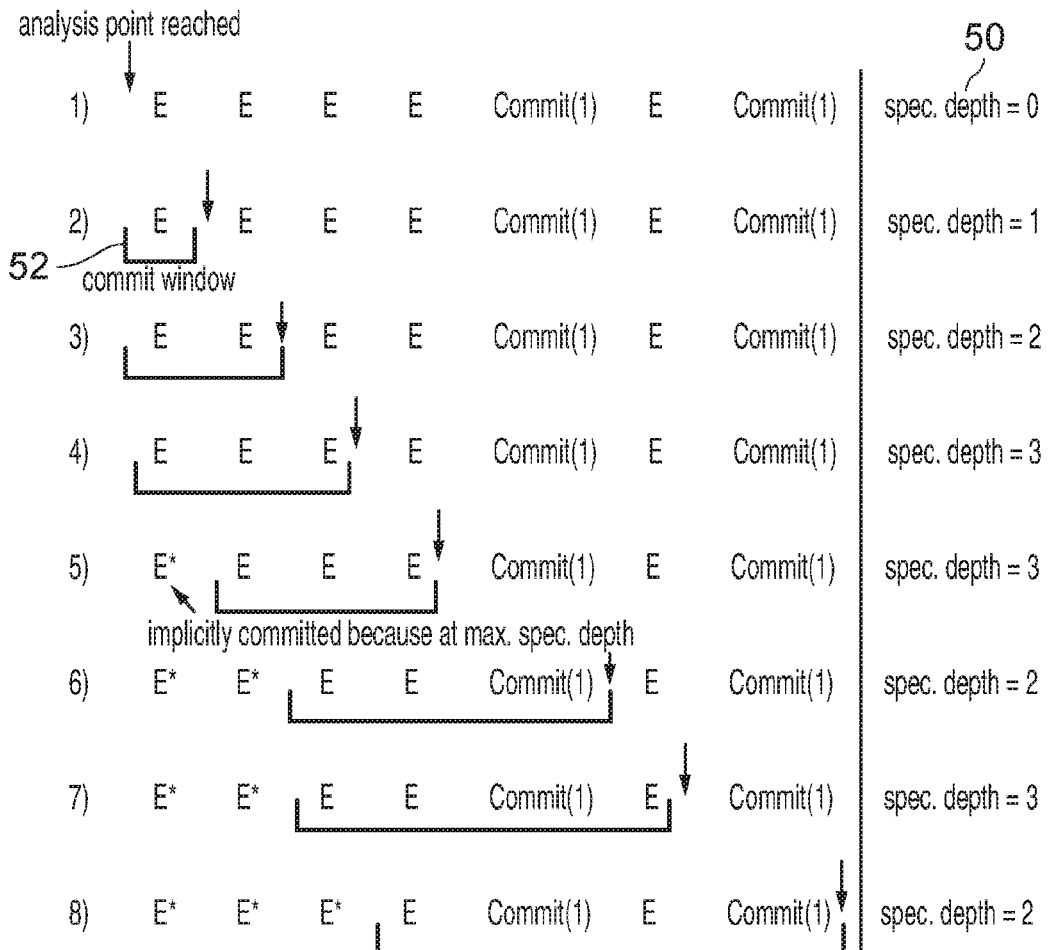
FIGS. 5 and 6 show examples showing how the trace analyser can deduce which elements relate to committed or cancel instructions based on the commit and cancel elements generated by the trace module.

FIG. 5 shows an example of how a sequence of P0 elements and commit elements output by the trace module 12 can be analysed by the trace analyser 6 in order to determine properties of the processing being performed by the processing circuitry, showing an example of the implicit commitment of speculative elements. As shown in FIG. 5, the trace analyser steps through the sequence of trace elements one by one to make deductions about the outcome of processing. In this example, for ease of explanation the sequence only comprises E elements and Commit elements. The trace analyser tracks a parameter indicating the current speculation depth 50 as it parses the trace stream, and also maintains a parameter indicating the position of the commit window 52, which represents the portion of the trace stream in which the elements are still speculative (i.e. the commit window comprises speculative elements relating to instructions which have been speculatively executed by the processing circuitry but which at the current analysis point are still to be deduced as committed or resolved). In the notation of FIG. 5, the current analysis point reached by the analyser 6 is indicated by a down-pointing arrow, the position of the commit window 52 is indicated by a bracket below the elements within the commit window, and the elements whose status have already been resolved by the trace analyser 6 are indicated with an asterisk. In this example, the maximum speculation depth is assumed to be 3.

Analysis of the trace stream in this example proceeds as follows (corresponding to the steps shown in FIG. 5):

1. The trace analyser starts analysing the trace stream.
2. The trace analyser determines from the first E element that one or more instructions have been executed speculatively, and so increases the speculation depth to 1. The commit window 52 now comprises the first E element of the sequence.
3. Another E element is encountered, which increases the speculation depth and the size of the commit window to 2 elements.
4. Another E element is encountered, which increases the speculation depth and size of the commit window to 3 elements.
5. Another E element is encountered. As the current speculation depth was already at the maximum speculation depth (3), the output of a further speculative element E implicitly indicates that the first E element of the stream has been committed, because as the processing circuitry 8 was already at its maximum speculation depth it would not have been able to perform further speculation until the oldest speculation had been committed. Therefore, the first E element is now indicated with an asterisk to indicate that it was resolved, and the commit window now comprises the second to fourth E elements of the stream. The current speculation depth remains at 3.
6. The next element in the sequence is a Commit element specifying that the number of elements to be committed is one. The oldest speculative element in the commit window (the second E element of the sequence, now marked with an asterisk) is deduced as committed and the start of the commit window moves on to exclude this committed element. When one or more elements are committed, the speculation depth is decremented by the number of committed elements, hence the speculation depth is now 2 (reflecting that there are still 2 speculative elements remaining within the commit window).

7. A further E element detected, and so the speculation depth increases to 3 and the size of the commit window increases.
8. Another Commit element indicates that the oldest speculative element in the commit window (the third element starting from the beginning of the trace stream) has been committed, and again the speculation depth is decremented to 2.

In summary, by using the commit elements to indicate the outcome of previous speculative elements then this can allow the trace analyser to determine which trace elements output by the trace module prior to the commit elements can be trusted.

Figure 6:
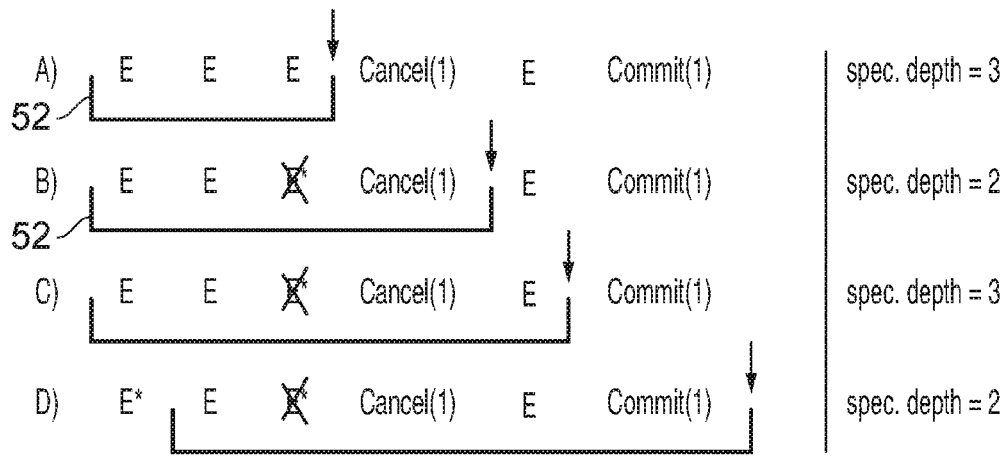

FIG. 6 shows a corresponding example where at least one Cancel element is included:
A. At step A, the status of the trace analyser is similar to that of step 4 of FIG. 5 (i.e. steps 1-3 of FIG. 5 are for conciseness not shown in FIG. 6).
B. The next element analysed in the trace stream is a Cancel element specifying 1 as the number of elements to be cancelled. Hence, the youngest element of the commit window is cancelled (i.e. the analyser 6 deduces that the corresponding instructions should not have been executed). The cancel element causes the speculation depth to be decremented to 2, but the oldest element in the commit window remains unresolved, so the start position of the commit window remains the same. If the cancelled element relates to a mispredicted branch, a branch mispredict element could also have been included (it is not shown in FIG. 6 for conciseness).
C. A further E element is received which increases the speculation depth to 3, and the commit window now comprises 3 speculative elements (although the window actually spans 4 P0 elements, the cancelled E element is not considered to contribute to the speculation depth as it is not a speculative element as its outcome has already been resolved).
D. The next element is a Commit element, which indicates that the oldest element in the commit window 52 is committed, and the speculation depth is decreased to 2 and the start of the commit window 52 moved on to the second element of the stream.

The technique using commit and cancel elements shown in FIGS. 3 to 6 may be useful for tracing the execution of instructions when micro-architectural speculation mechanisms are being used by the processing circuitry 8 to improve performance by executing some instructions before it is known that they should definitely be executed. Limiting the commit window to a certain maximum speculation depth can be useful because typically the processing circuitry 8 only has a finite amount of micro-architectural resource available for tracking the speculations being performed.

However, processes may also support an architectural form of speculation called transactional memory. Transactional memory can be useful in cases where multiple threads of processing executing within a data processing system (either time-shared on a single processing element or executing on different processing elements in parallel) need to access a shared resource and the nature of the data processing operations may be such that once a thread starts interacting with the shared resource, it may be necessary for a set of operations to complete atomically using the resource without another thread accessing the resource in the meantime. One technique for handling this conflict between threads may be to use locks to control exclusive access to at least one target resource. For example, when one thread starts accessing data in a particular address region, the thread may set a lock variable to claim ownership of the lock, and then while the lock owning thread has ownership of the lock, other threads checking the lock variable may determine that the lock is already claimed and so may not enter the section of code which interacts with that address region. Such a lock-based approach can be seen as pessimistic in that each thread by default assumes that it cannot enter the section of code which access the shared resource because a conflict with another thread may occur, unless it has ownership of the lock guaranteeing that no conflict can occur. However, often a lock identifier may control exclusive access to a number of resources (e.g. a range of addresses), and so it is not guaranteed that if one thread is accessing certain resources within the set of resources protected by the lock variable, another thread will definitely access the same resource. Hence, a lock-based approach may, in cases where conflicts between threads are rare, lead to a loss of performance because threads may unnecessarily be waiting for the locks to be released before entering the critical section of code which uses the shared resource.

Figure 7:
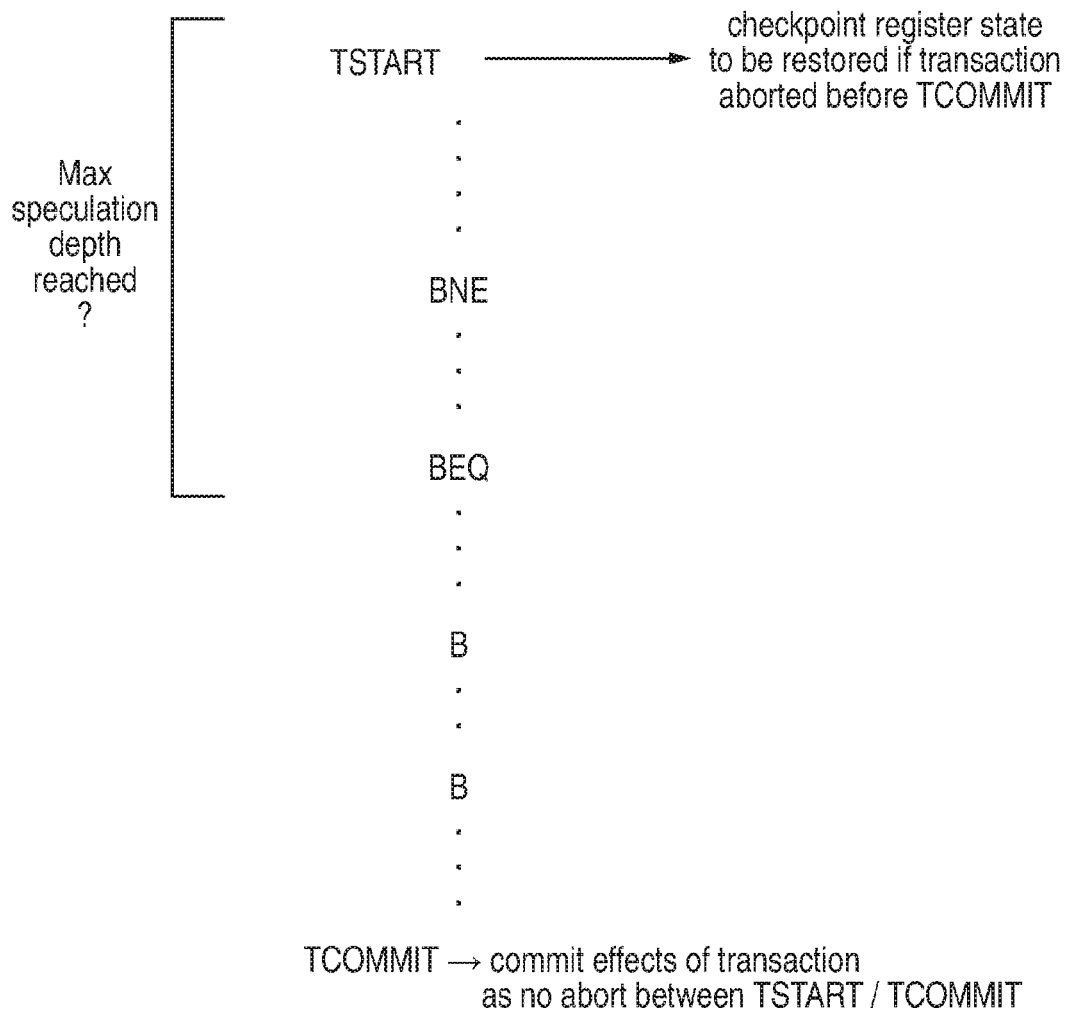
FIG. 7 shows an example of a transaction comprising sequence of instructions executed between a transaction start instruction and a transaction end instruction.

A more optimistic approach for handling conflicts between threads accessing shared resources can be to use transactional memory support. A data processing system may have circuitry to support execution of a transaction within a thread of data processing by the processing circuitry. As shown in FIG. 7, the transaction comprises the instructions of the thread which are executed between a transaction start instruction TSTART marking the beginning of the transaction and a transaction end instruction TCOMMIT marking the end of the transaction. Between the transaction start and end instructions, the processing circuitry may speculatively execute the intervening instructions and prevent commitment of the results of those speculatively executed instructions until the transaction end instruction is reached. Occurrence of an abort event following execution of the transaction start instruction (but before the transaction end instruction is reached) may result in the transaction being aborted and the speculative results being discarded. There may be a number of reasons for aborting a transaction, such as a detected conflict with a memory access made by another thread, execution of a type of instruction not supported within a transaction, or the occurrence of an exception during processing of a transaction. With a transactional memory approach each thread may optimistically start processing the critical section of code assuming that no conflicts with other threads will occur, and then if the end of the critical section is reached without any conflict being detected the results of the transaction can be committed. In cases where conflict is rare, using transactional memory support can improve performance by allowing more threads to concurrently process their critical sections of code.

Hence, the target processing circuitry 8 in the data processing apparatus 4 may have various transactional memory support resources 60 for supporting execution of instructions according to an instruction set architecture which supports the execution of transactions at an architectural level. The transactional memory support circuitry 60 may take various forms and may include a number of resources which assist with processing of transactions. For example, the transactional memory support circuitry 60 may include speculative result storage circuitry for storing the results of the speculatively executed instructions for at least one transaction of at least one thread. In some cases, multiple sets of speculatively executed results may be stored for transactions running in different threads. It is not essential for all speculative results to be stored in the speculative result storage circuitry. For example, the transactional memory support circuitry may also have restoration state storage circuitry to store state captured in response to the transaction start instruction which is restored on aborting the transaction. Hence, register state or other architectural state values which are restored upon the aborting of the transaction need not be stored in the speculative result storage circuitry since the current values in the architectural registers of the processor may effectively indicate those speculative results (which would be overwritten with the restoration state upon an abort of the transaction). The speculative result storage circuitry could for example store results of store instructions for storing values to memory. By holding the speculative results for store instructions in the speculative result storage circuitry until the transaction is committed, this avoids polluting the memory with data values which may subsequently turn out to be incorrect or may cause other threads to behave incorrectly.

In another example, the transactional memory support circuitry may comprise conflict detection circuitry to detect conflicts between a data access to a given address made within a transaction of a first thread and a data access to the same address made by another thread (either within a transaction or in a non-transactional thread). For example, address tracking circuitry may be provided to track the addresses accessed by instructions within a transaction. The conflict detection circuitry may detect conflict when another thread accesses one of the addresses recorded in the address tracking circuitry. When a conflict is detected, the conflict detection circuitry may trigger an abort of the transaction of the first thread for which the addresses are being tracked.

The transactional memory support circuitry could also have circuitry for detecting other events which may cause aborting of a transaction. For example, on receipt of an interrupt or exception, the transaction could be aborted. Also a transaction may be aborted if the transactional memory support circuitry runs out of resources (e.g. if the number of speculative results to be stored in the speculative result storage circuitry or a number of addresses tracked by the address tracking circuitry exceeds the capacity available within the storage provided), so that it is no longer possible to guarantee that the transaction will proceed correctly without conflict. Also, certain types of instruction may be inappropriate for being processed within a transaction and on encountering a type of instruction not allowed within a transaction the transaction may be aborted. On aborting a transaction, it may be up to software to determine whether to try to execute the transaction again or to execute an alternative code path using a non-transaction based mechanism such as using locks.

One might expect that if the trace module 12 already supports the trace architecture capable of tracing micro-architectural speculation, then the same mechanisms could also be used for tracing architectural speculation using transactions. For example, another E element could be generated when the monitoring circuitry 18 detects the target processing circuitry 8 executing a transaction start instruction to indicate that this represents a point beyond which execution is speculative. If the transaction is aborted, that E element (and any subsequently generated E elements associated with the instructions executed within the transaction) could be cancelled, by outputting a Cancel element in the trace stream. If the transaction reaches the transaction end instruction without an abort occurring, the entire transaction can be committed, and the trace module 12 could output a commit element to commit all the E elements associated with the transaction.

However, unlike micro-architectural speculation where the depth of speculation that can be reached is typically limited to some maximum number, based on the limited micro-architectural resources provided in the processing circuitry 8 for tracking speculative execution, with transactional memory, since register state is captured at the transaction start instruction and the transaction could include a potentially unlimited number of instructions until the transaction end instruction is reached, there is no fixed limit to the speculation depth that can be reached during a transaction (the number of speculative trace elements that may be output before the oldest speculative element can be resolved). This may be difficult to trace adequately with a trace module 12 which uses the maximum speculation depth 24 to track whether explicit commit elements are required. For example if E elements are output on the transaction start instruction and the first few branches within the transaction as shown in FIG. 7 then the maximum speculation depth may soon be reached, and then the trace module would normally assume that when the next branch is committed this would imply that the oldest remaining speculatively output element for the TSTART instruction should also be committed. However, with a transaction this would not be correct since the E element representing the TSTART instruction may still be speculative even if later branches are ready to be resolved.

One solution could be to increase the maximum speculation depth to make it more likely that all the speculation points within a transaction may remain within the commit window so that there is no need to imply committing of earlier instructions before the end of the transaction is reached. However whatever value is assumed for the maximum speculation depth, there may always be a chance that code could be executed with a greater number of speculation points within the transaction than the maximum speculation depth. Eventually, once the maximum speculation depth is reached, the trace module would not be able to output any further speculative elements until the TSTART instruction's E element can be resolved, so would not be able to provide any further trace information about subsequent processing within the transaction, making it difficult to identify causes of subsequent aborts or to enable the trace analyser to deduce how far the processing got through the transaction before an abort occurred. In any case, increasing the maximum speculation depth 24 may lead to less efficient trace resource usage when tracing non-transactional code, because it may increase the number of commit elements which have to be output to explicitly indicate committing of earlier elements.

These issues can be addressed by providing the commit window move element discussed above, which enables the start of the commit window to be moved even though the oldest remaining speculative element has not yet been committed. For example when a TSTART instruction marking the start of a transaction is encountered, an E element may be output, and a commit window move element may also be output by the trace output circuitry 20 to indicate that the commit window should actually be considered to start at the next element after the speculative E element corresponding to the TSTART instruction. By excluding the speculative element corresponding to the TSTART instruction from the commit window without actually committing that element, this enables subsequent Commit elements to act on the next element, so that more useful trace information can be generated tracking the progress through the transaction, without needing to greatly increase the maximum speculation depth 24 and hence enabling more efficient use of the trace resource available (e.g. space in the buffer 14 or bandwidth on the trace output port 16).

Figure 8:
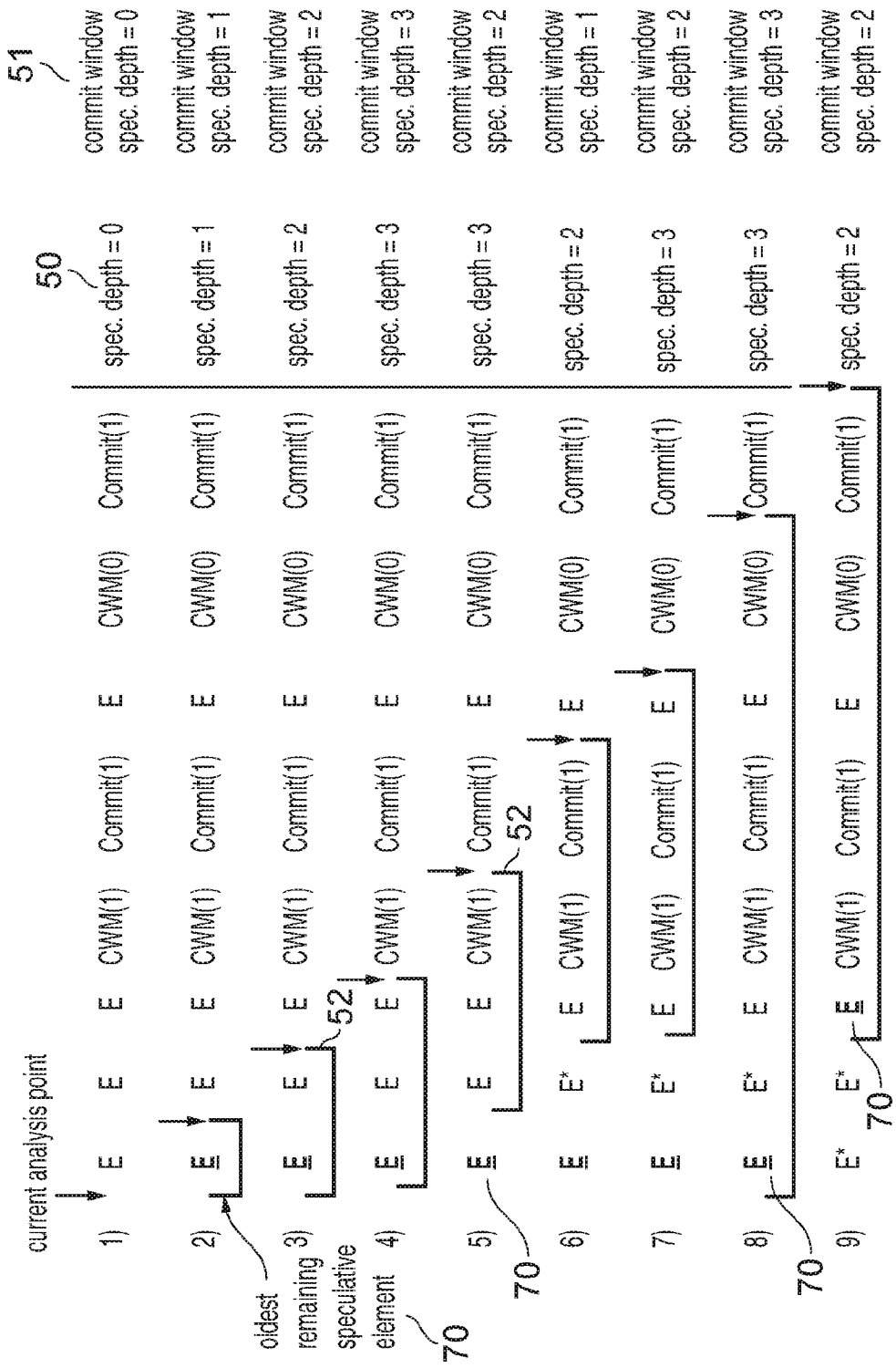
FIG. 8 shows an example of analysing a sequence of trace elements included a commit window move element.

FIG. 8 shows a similar example to FIGS. 5 and 6 illustrating trace analysis when commit window move elements are included. In this example an encoding of the commit window move element is used as shown in FIG. 2, in which an element CWM(0) specifying the window start parameter of 0 represents a commit window reset element. In addition to the notations used in FIGS. 5 and 6 to indicate the current analysis point (down arrow), the commit window position 52 (bracket) and the resolved elements (asterisk), in FIG. 8 the oldest remaining speculative element 70 in the entire trace stream is indicated using bold and underline font. The positions of the oldest remaining speculative element 70 and the start (oldest speculative element) of the commit window 52 may be indicated in the status registers 22 within the trace module and may also be tracked by the trace analyser 6 when analysing the trace stream. Similarly the current speculation depth 50 may also be tracked within the status register 22 by the trace module and in any trace analysis status by the trace analyser 6. Steps 1 to 4 of FIG. 8 are the same as in FIG. 5 and so are not described in detail again. The oldest remaining speculative element 70 in steps 2 to 4 is the first element of the trace stream (as no elements have been committed yet). The subsequent steps of FIG. 8 proceed as follows:

5. The next element to be analysed by trace analyser 6 is a CWM(1) element, which indicates that while the oldest remaining speculative element 70 has not itself been committed, the commit window 52 should be moved on by 1 element position relative to the oldest remaining speculative element, so now spans the second to fourth elements of the trace stream. The commit window move element does not change the actual speculation depth (as there are still three speculative elements unresolved), but the commit window speculation depth 51 (number of speculative elements within the commit window itself) is now 2. The commit window speculation depth 51 could be tracked separately from the overall speculation depth 50 in the status registers 22 of the trace module and in a corresponding manner by the trace analyser 6. For determining whether to output a commit element, the trace module 12 may compare the commit window speculation depth 51 with the maximum speculation depth 24, rather than comparing the total speculation depth, as following the CWM(1) element the oldest remaining speculative element is now outside the commit window.

6. The next element analysed in the trace stream is a Commit element. Following step 5 the oldest speculative element of the commit window is the second element of the trace stream as a whole, which is now indicated with an asterisk in step 6 to indicate that it has been resolved. The oldest remaining speculative element 70 which remains uncommitted. The total and commit window speculation depths 50, 51 are decremented to 2 and 1 respectively.

7. Another E element is detected which increases the total/commit window speculation depths 50, 51 to 3 and 2 respectively as the commit window is extended.

8. The next element analysed is a CWM(0) element, i.e. a commit window reset element, so the start of the commit window 52 is reset to start at the oldest remaining speculative element 70. The total speculation depth 50 remains at 3 as there are still only 3 speculative elements, and the commit window speculation depth 51 also becomes 3 as the oldest remaining speculative element 70 is now inside the commit window again. The 3 speculative elements within the commit window are the $1^{st}$, $3^{rd}$ and $6^{th}$ elements of the trace stream shown.

9. The next element detected is a Commit(1) element, indicating that the oldest speculative element in the commit window is committed. In this case, the oldest speculative element in the commit window is also the oldest remaining speculative element of the stream as a whole. The commit window moves forward and the oldest remaining speculative element 70 now becomes the $3^{rd}$ element of the trace stream, which is the oldest element which is still unresolved. The total and commit window speculation depths 50, 51 are decremented to 2.

In summary, the different types of elements have the following effect on the status parameters 22 maintained by the trace module 12 and trace analyser 6:

| Element type | Oldest remaining speculative element 70 | Oldest element (start) of commit window 52 | Total speculation depth 50 | Commit window speculation depth 51 |
| --- | --- | --- | --- | --- |
| E or N | If oldest remaining speculative element 70 = oldest element of commit window AND commit window speculation depth 51 = maximum speculation depth 24: next oldest element of commit window 52. Else: unchanged | If commit window speculation depth 51 = maximum speculation depth 24: next oldest element of commit window 52 Else: unchanged. | If commit window speculation depth 51 already at maximum speculation depth: unchanged (because implied commit not explicitly shown in trace stream) Else: increment by 1 | |
| CWM(n) (n > 0) | Unchanged | $n^{th}$ speculative element after oldest remaining speculative element 70 | Unchanged | Decrement by n |
| CWM(0) | Unchanged | Oldest remaining speculative element 70 | Unchanged | equal to total speculation depth 50 |

-continued

| Element type | Oldest remaining speculative element 70 | Oldest element (start) of commit window 52 | Total speculation depth 50 | Commit window speculation depth 51 |
| --- | --- | --- | --- | --- |
| Commit(n) (n > 0) | If oldest remaining speculative element 70 = oldest element of commit window: $n^{th}$ speculative element after oldest remaining speculative element Else: Unchanged | $n^{th}$ speculative element after oldest element of commit window 52 | Decrement by n | Decrement by n |
| Cancel(n) (n > 0) | Unchanged | Unchanged | Decrement by n | Decrement by n |

A status information packet indicating one or more of the four parameters shown in the table above may be output periodically (e.g. at intervals of a certain number of packets or certain time period) by the trace module. In some examples it may not be necessary to explicitly represent the overall speculation depth 50 in the status information 22, as the commit window speculation depth 51 may be enough to allow the information of interest to be reconstructed by the trace analyser 6.

FIG. 9 shows an example of execution of a sequence of instructions including a transaction which illustrates an example use case for the commit window move element. It will be appreciated that this is just one example of a possible implementation and other systems supporting the same trace architecture may have a micro-architectural implementation which generates the elements at a slightly different timing, or in response to different events.

0x1000: A TSTART instruction is executed by the target processing circuitry 8. The first four trace elements shown in FIG. 9 are the same as in FIG. 3 to mark the start of tracing. The TSTART instruction also triggers the trace module 12 to generate an E element as the TSTART instruction represents a point beyond which execution is speculative. Also, the trace module 12 generates a CWM(1) element because the transaction will be expected to remain speculative for an indefinite period and it may be needed to commit later elements before the transaction as a whole can be committed. The CWM(1) means the commit window speculation depth 51 returns to 0 although the overall speculation depth 51 is 1 (the E atom corresponding to TSTART is still speculative but outside the commit window 52). The commit window currently contains zero speculative elements, so the oldest element of the commit window 52 will be the next speculative element generated by the trace module 52.

0x2000-0x2008: MOV, LDR and CMP instructions are executed, none of which are waypoint instructions, and so no trace elements are generated.

0x200C: The branch is predicted not taken, so the trace module 12 generates an N element. The N element implies the execution of the three previous instructions and the BEQ instruction. The overall and commit window speculation depths 50, 51 increment to 2 and 1 respectively. The oldest remaining speculative element 70 is still the E element output at 0x1000, but the oldest element of the commit window is the N element output at 0x200C.

0x2014: The branch is predicted taken, so the trace module 12 generates an E element. The E element implies the execution of the B instruction and any intervening instructions between BEQ at 0x200C and B at 0x2014. Overall and commit window speculation depths 50, 51 increase to 3 and 2.

0x4000-0x4004: The LDR and CMP instructions are not waypoint instructions and so do not trigger generation of any trace elements.

0x4008: The branch is predicted not taken, so the trace module 12 generates an N element. The N element implies the execution of the LDR and CMP instructions and the BNE instruction. Overall and commit window speculation depths 50, 51 increase to 4 and 3.

Branch at address 0x2000 is determined to have been correctly predicted: trace module 12 does not need to output a Commit element because the commit window speculation depth 51 equals the maximum speculation depth (3 in this example). The overall and commit window speculation depths 50, 51 remain the same despite the committing of an element, because from the point of view of the trace analyser 6 this commitment will not become visible until the next P0 element is output, so at this point the trace analyser 6 still perceives 3 elements as speculative in the commit window and 4 speculative elements within the trace stream as a whole. For the same reason, the trace analyser 6 still perceives the oldest speculative element of the commit window 52 as the N element which was output at 0x200C. The oldest remaining speculative element 70 of the stream as a whole is unchanged (still the E element output at 0x1000).

0x400C: the branch is predicted taken and so an E element is output. When detecting this E element, the trace analyser 6 will determine that, as the commit window speculation depth 51 was at the maximum of 3 prior to encountering this element, the output of the new E element implicitly indicates that the N element output at 0x200C can be deduced as committed. As the commit window speculation depth 51 was already at the maximum, the overall and commit window speculation depths 50, 51 remain the same (effectively the increment which would normally be performed in response to the E element has been cancelled out by the implicit committing of the earlier N element associated with address 0x200C). Now that the N element at 0x200C has been deduced as committed, the oldest element of the commit window 52 becomes the E element output at 0x2014.

0x8000: ADD instruction is not a waypoint instruction, so no trace element is output.

0x9000: TCOMMIT instruction indicates that the transaction has completed without an abort. A commit window reset element CWM(0) is output to reset the commit window to start at the oldest remaining speculative element 70 (E element output at 0x1000). The trace module then outputs a Commit(1) element to commit the oldest element of the commit window, which is now also the oldest remaining speculative element 70. The overall and commit window speculation depths 50, 51 become 3 following output of the CWM(1) and Commit(1) elements, as there are still 3 unresolved elements: E output at 0x2014, N output at 0x4008, E output at 0x400C). While FIG. 9 illustrates a temporary increment of the commit window speculation depth 51 to 4 (above the maximum) in response to output of the CWM(0) element, it is immediately cancelled out by the decrement following the output of the Commit(1) element. It will be appreciated that some trace module micro-architectures could choose not to increment the commit window speculation depth 51 at all if it is known that it will be immediately cancelled out as a Commit element is issued.

Commit all execution: All branch predictions are determined to be correct, and a Commit(3) element is output to indicate that all remaining E/N elements are committed.

In summary, by using the commit window move element, the element associated with the transaction start instruction may remain speculative for some time even as younger elements are committed, to allow more effective tracing of transactions which can improve the diagnostic information provided. It will be appreciated that the commit window move elements could also be used for other types of speculation (not just transactions).

Figure 10:
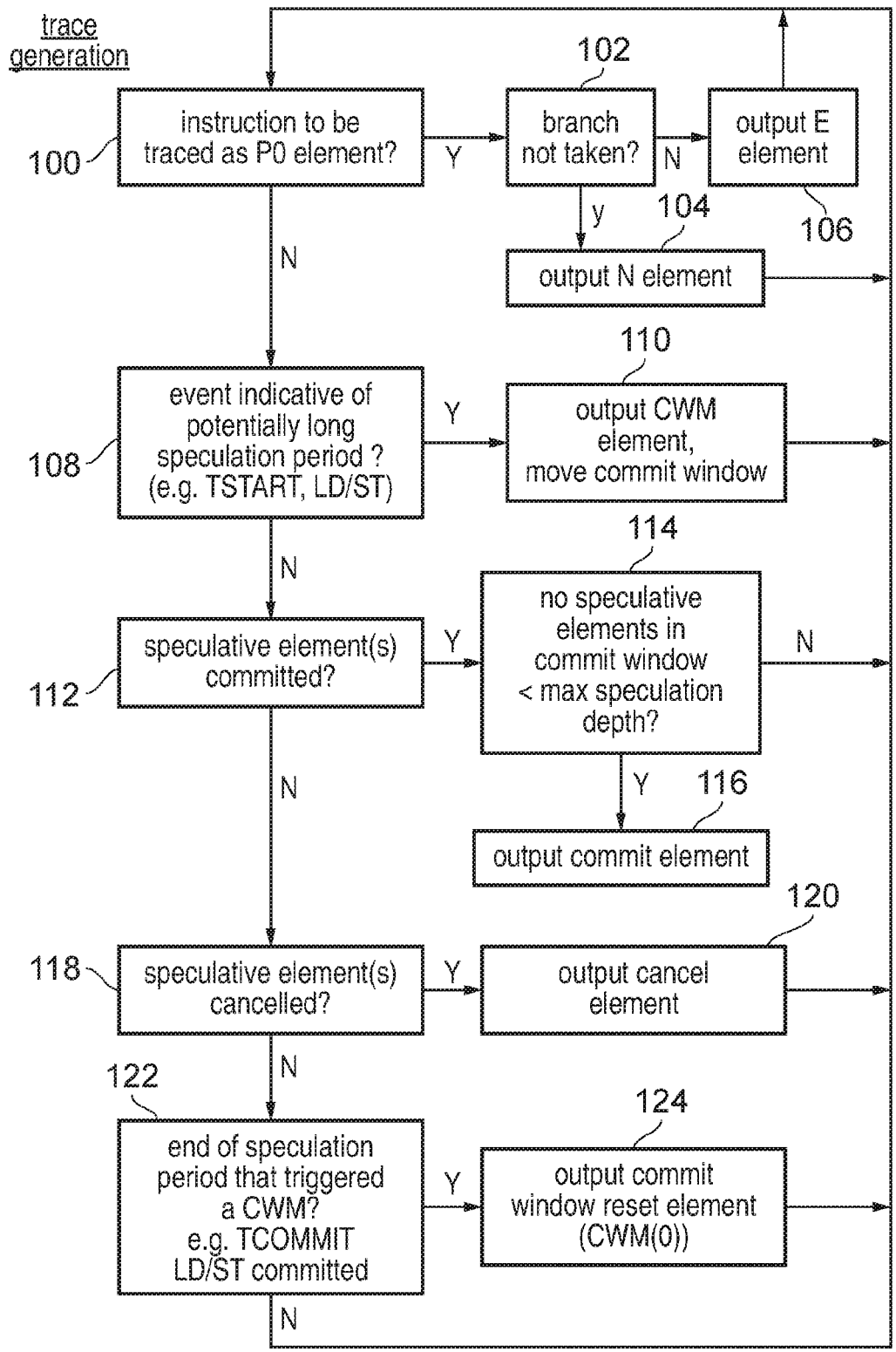
FIG. 10 is a flow diagram showing an example method of generating trace elements.

FIG. 10 is a flow diagram showing a method of generating trace elements using the trace module 12. The flow diagram shows the trace module responding to a number of events detected by the processing circuitry 8 by the monitoring circuitry 18. It will be appreciated that these are not all the events that may be traced and other events could also lead to output of trace information.

At step 100 the monitoring circuitry determines whether the current instruction executed by the processing circuitry is a waypoint instruction to be traced using a P0 element. For example such an instruction could be a branch instruction, a TSTART instruction or other types of instruction. If the instruction is to be traced using a P0 element, then at step 102 the monitoring circuitry determines whether that instruction is a branch instruction which is predicted as not taken. If the instruction is a not-taken-predicted branch, then at step 104 the monitoring circuitry 18 controls the trace output circuitry to output an N element as the next element of the trace stream. If the instruction is either not a branch, or is a branch which is predicted to be taken, then an E element is output by the trace output circuitry 20 at step 106.

If at step 108 the monitoring circuitry determines that the processing circuitry 8 has encountered an event indicative of a potentially long speculation period, such as the execution of a TSTART instruction or the execution of a predetermined type of load/store operation, then (having output any E elements or other speculative elements associated with that event), at step 110 the monitoring circuitry 18 controls the trace output circuitry 20 to also output a commit window move (CWM) element. The number of elements by which the commit window is to be moved may depend on how many other trace elements are associated with the event which caused the output of the CWM element, or how many previous elements have been output and remain speculative.

At step 112 the monitoring circuitry 18 of the trace module 12 determines whether the processing circuitry has committed instructions which correspond to one or more previously output speculative elements of the trace stream. If so, then at step 114 the monitoring circuitry determines whether the number of speculative elements in the commit window (the commit window speculation depth 51) is currently less than the maximum speculation depth 24. If not (when the commit window speculation depth 51 is equal to the maximum speculation depth), then no elements need to be output in the trace stream, as the committed element can be deduced by the trace analyser from the output of the next P0 element. However, if the number 51 of speculative elements in the commit window 52 is less than the maximum speculation depth 24, then at step 116 a commit element is output specifying the number of elements to be committed.

At step 118 the monitoring circuitry detects whether the processing circuitry has cancelled any speculatively executed instructions which correspond to speculative elements previously output in the trace stream, and if so then at step 120 the monitoring circuitry 18 controls the trace output circuitry 20 to output a cancel element in the trace stream specifying the number of the youngest elements of the commit window that are to be cancelled.

At step 122 the monitoring circuitry detects whether the processing circuitry has reached the end of the speculation period whose start triggered a CWM element to be output. For example, events that could be detected at step 122 could include the execution of the transaction end (TCOMMIT) instruction or the commitment of a speculated load/store instruction by the processing circuitry. If one of these events is detected then at step 124 the monitoring circuitry 18 controls the trace output circuitry 22 outputs a commit window reset element, e.g. a CWM element specifying 0 as the window start parameter, which would trigger the trace analyser to move the start to the commit window 52 back to the oldest remaining speculative element 70 in the trace stream.

Regardless of which type of element is output by the trace, following any of steps 104, 106, 110, 114, 116, 120, 124, the method returns to step 100 to check for another event at the processing circuitry. The method cycles round as the processing circuitry steps through the program being executed.

Figure 11:
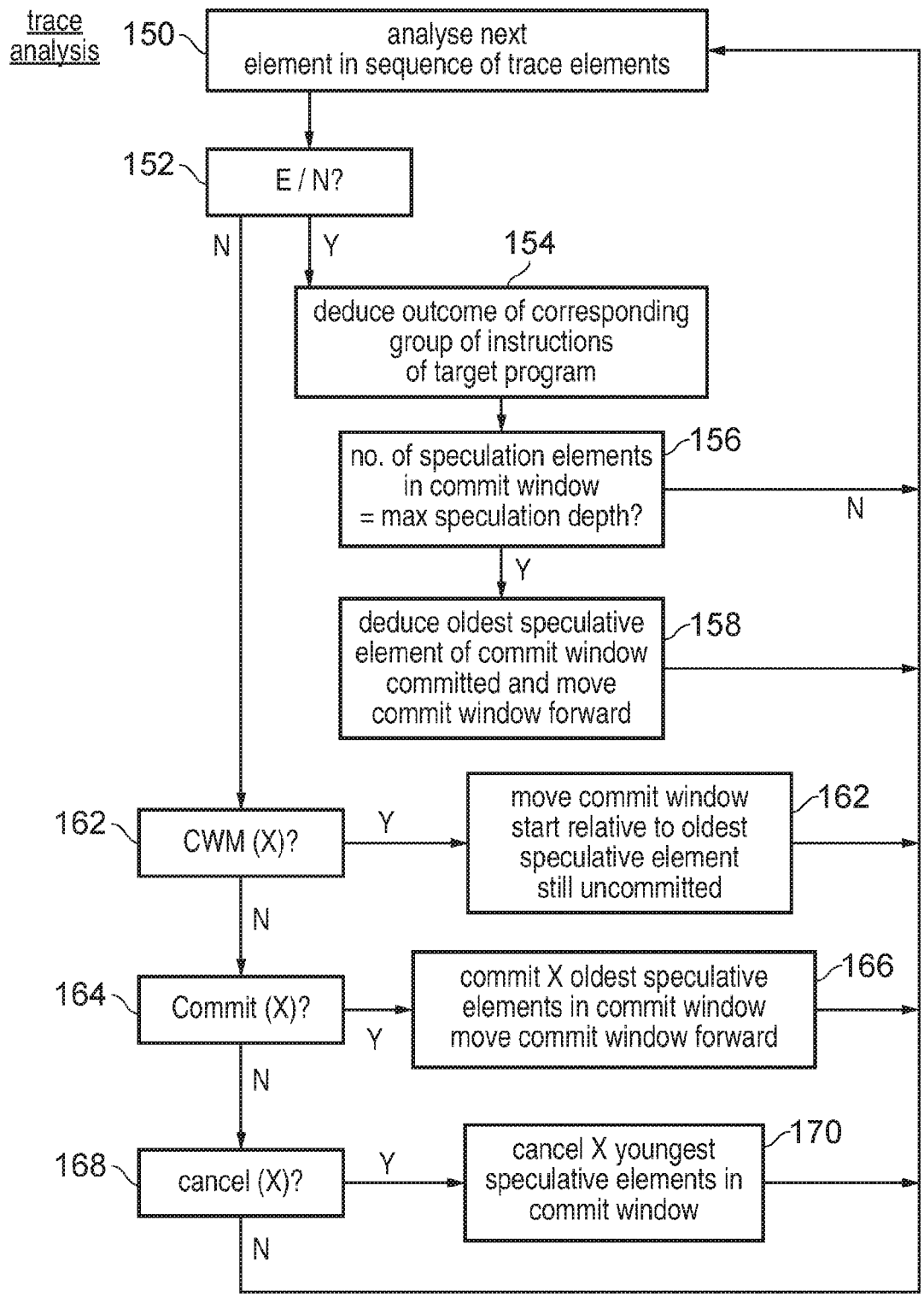
FIG. 11 is a flow diagram showing a method of analysing a sequence of trace elements.

FIG. 11 shows a flow diagram showing a method of analysing a stream of trace elements generated by the trace module, which is performed by the trace analyser 6. The host processing circuitry 30 executing the trace analysis program 32 receives a copy of the target program 36 executed by the target processing circuitry and uses this to interpret the sequence of trace elements received from the trace storage 34. At step 150, the trace analyser 6 analyses the next element in the sequence of trace elements which has not yet been reviewed.

At step 152 it is determined whether the next element is a P0 element, e.g. an E or N element as discussed above. If so then at step 154 the trace analyser determines from the copy of the target program 36 which instructions correspond to the E or N element and deduces the outcome of those instructions based on the E or N element. For example, an E or N element may imply that any instructions preceding the next waypoint instruction were executed, as well as indicating the outcome of the next waypoint instruction in the target program 36. At step 156 the trace analyser determines whether the commit window speculation depth 51 (indicating the number of speculative elements in the commit window) is currently equal to the maximum speculation depth 24 defined for the particular trace module which generated the trace stream. If not, then no deduction about the commitment of any earlier elements can be made at this stage, and the method returns to step 150. However, if the commit window speculation depth 51 equals the maximum speculation depth 24, then at step 158 the trace analyser can also deduce that the oldest speculative element in the commit window 52 has been committed and may move the commit window forward to start at the next oldest speculative element of the commit window. Hence, even though no explicit commit element was included in the trace stream, a deduction about the commitment of earlier elements can still be made. When the oldest speculative element is deduced to be committed, this means that a corresponding block of one or more instructions in the target program 36 can be determined to have been executed correctly without a misprediction.

At step 160 the trace analyser 6 determines whether the next element in the trace stream is a CWM(X) element. If so then at step 162 the trace analyser updates its internal state to indicate that the commit window start position is moved to the $X^{th}$ speculative element after the oldest remaining speculative element 70 of the entire trace stream. If x=0 then this is effectively a commit window reset and the commit window now starts at the oldest remaining speculative element 70 itself. If x>0 then the commit window 52 is moved to start at a later element than the oldest remaining speculative element 70.

At step 164, if the next element in the trace stream to be analysed is a commit element Commit(X) then at step 166 the trace analyser determines that the X oldest speculative elements in the commit window 52 have been committed, where X is the parameter specified by the commit element, and also moves the start of the commit window forward by X elements. Hence, the trace analyser can deduce that any blocks of instructions corresponding to those X oldest speculative elements were executed successfully by the target processor 8 when the trace stream is generated.

On the other hand, if at step 168 the next element in the trace stream is a Cancel(X) element then at step 170 the trace analyser determines that the X youngest speculative elements in the commit window should be cancelled, as these represent blocks of instructions which were executed incorrectly following an earlier misspeculation. Again the number of younger speculative elements to be cancelled is indicated by the parameter as specified in the cancel element.

Regardless of the type of element detected, then once any deductions about the behaviour of the target processing circuitry 8 have been made and any updates to the trace status information (e.g. speculation depth, commit window position, etc.) have been made then the method returns to the step 150 to analyse the next element in the sequence.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A trace module comprising:
monitoring circuitry to monitor processing of instructions by processing circuitry; and
trace output circuitry to output a sequence of elements indicative of outcomes of the processing of the instructions by the processing circuitry; in which:
the trace output circuitry is capable of outputting:
a commit element indicative of the processing circuitry having committed one or more speculatively executed instructions represented by at least one oldest speculative element in a commit window of the sequence of elements, the commit window comprising a portion of the sequence of elements comprising at least one speculative element representing at least one speculatively executed instruction which is still to be committed by the processing circuitry, where the commit element is also indicative that following the commit element said at least one oldest speculative element is to be excluded from the commit window; and
a commit window move element indicative that, while one or more speculatively executed instructions represented by an oldest remaining speculative element of the sequence of elements remain uncommitted by the processing circuitry, the commit window should move relative to the oldest remaining speculative element to change which speculative element is the oldest speculative element of the commit window.

2. The trace module according to claim 1, in which:
in response to the processing circuitry committing one or more speculatively executed instructions represented by the at least one oldest speculative element in the commit window:
when a number of speculative elements in the commit window is less than a maximum speculation depth, the trace output circuitry is configured to output the commit element; and
when a number of speculative elements in the commit window equals the maximum speculation depth, the trace output circuitry is configured to suppress output of the commit element.

3. The trace module according to claim 1, in which the commit window move element specifies a window start indicator indicative of the speculative element which should become the oldest speculative element of the commit window following the change in position of the commit window indicated by the commit window move element.

4. The trace module according to claim 3, in which the window start indicator identifies a number of speculative elements, including the oldest remaining speculative element of the sequence of elements, which are to be older than the oldest speculative element of the commit window following the change in position of the commit window indicated by the commit window move element.

5. The trace module according to claim 1, in which the trace output circuitry is configured to output the commit window move element in response to the monitoring circuitry detecting the processing circuitry executing a transaction start instruction representing a start of a transaction comprising one or more instructions executed between the transaction start instruction and a transaction end instruction for which effects of the instructions of the transaction are to be committed when the transaction end instruction is reached in the absence of an abort event occurring between the transaction start instruction and the transaction end instruction.

6. The trace module according to claim 1, in which the trace output circuitry is configured to output the commit window move element in response to the monitoring circuitry detecting the processing circuitry executing a predetermined type of load/store instruction.

7. The trace module according to claim 1, in which the trace output circuitry is capable of outputting a commit window reset element indicative that the oldest remaining speculative element of the sequence of elements should become the oldest speculative element of the commit window.

8. The trace module according to claim 7, in which the commit window reset element comprises the commit window move element specifying a window start indicator indicating that the oldest remaining speculative element of the sequence of elements should become the oldest speculative element of the commit window.

9. The trace module according to claim 7, in which the trace output circuitry is configured to output the commit window reset element in response to the monitoring circuitry detecting the processing circuitry executing a transaction end instruction representing an end of a transaction comprising one or more instructions executed between a transaction start instruction and the transaction end instruction for which effects of the instructions of the transaction are to be committed when the transaction end instruction is reached in the absence of an abort event occurring between the transaction start instruction and the transaction end instruction.

10. The trace module according to claim 7, in which the trace output circuitry is configured to output the commit window reset element in response to the processing circuitry committing a predetermined type of load/store instruction.

11. The trace module according to claim 1, in which the trace output circuitry is capable of outputting a cancel element indicative of the processing circuitry having cancelled an effect of one or more speculatively executed instructions represented by at least one youngest speculative element in the commit window.

12. The trace module according to claim 1, in which the monitoring circuitry is configured to maintain status information indicative of at least one of:
the oldest remaining speculative element of the sequence of elements; and
the oldest speculative element of the commit window.

13. The trace module according to claim 1, in which the trace output circuitry is capable of outputting a trace information element indicative at least one of:
the oldest remaining speculative element of the sequence of elements; and
the oldest speculative element of the commit window.

14. A data processing apparatus comprising the trace module according to claim 1, and the processing circuitry.

15. A method for tracing processing of instructions by processing circuitry, comprising:
monitoring processing of the instructions by the processing circuitry; and
outputting a sequence of elements indicative of outcomes of the processing of the instructions by the processing circuitry;
the sequence of elements including:
a commit element indicative of the processing circuitry having committed one or more speculatively executed instructions represented by at least one oldest speculative element in a commit window of the sequence of elements, the commit window comprising a portion of the sequence of elements comprising at least one speculative element representing at least one speculatively executed instruction which is still to be committed by the processing circuitry, where the commit element is also indicative that following the commit element said at least one oldest speculative element is to be excluded from the commit window; and
a commit window move element indicative that, while one or more speculatively executed instructions represented by an oldest remaining speculative element of the sequence of elements remain uncommitted by the processing circuitry, the commit window should move relative to the oldest remaining speculative element to change which speculative element is the oldest speculative element of the commit window.

16. A trace analysis method comprising:
obtaining a sequence of elements indicative of outcomes of processing of instructions by target processing circuitry;
in response to detecting a commit element in the sequence of elements:
deducing that the target processing circuitry committed one or more speculatively executed instructions represented by at least one oldest speculative element in a commit window of the sequence of elements, the commit window comprising a portion of the sequence of elements comprising at least one speculative element representing at least one speculatively executed instruction which is still to be deduced as committed by the target processing circuitry, and
excluding said at least one oldest speculative element from the commit window for the analysis of subsequent elements of the sequence of elements; and
in response to detecting a commit window move element in the sequence of elements, moving the commit window relative to an oldest remaining speculative element of the sequence of elements to change which speculative element is the oldest speculative element of the commit window, while the oldest remaining speculative element remains still to be deduced as committed by the target processing circuitry.

17. A non-transitory storage medium storing a computer program for controlling a data processing apparatus to perform the method of claim 16.

18. An apparatus comprising:
host processing circuitry; and
non-transitory storage circuitry to store a computer program for controlling the host processing circuitry to perform the method of claim 16.

19. A trace analyser comprising:
a trace input to obtain a sequence of elements indicative of outcomes of processing of instructions by target processing circuitry; and
trace analysis circuitry responsive to detection of a commit element in the sequence of elements, to deduce that the target processing circuitry committed one or more speculatively executed instructions represented by at least one oldest speculative element in a commit window of the sequence of elements, the commit window comprising a portion of the sequence of elements comprising at least one speculative element representing at least one speculatively executed instruction which is still to be deduced as committed by the target processing circuitry, and to exclude said at least one oldest speculative element from the commit window for the analysis of subsequent elements of the sequence of elements;
in which in response to detecting a commit window move element in the sequence of elements, the trace analysis circuitry is configured to move the commit window relative to an oldest remaining speculative element of the sequence of elements to change which speculative element is the oldest speculative element of the commit window, while the oldest remaining speculative element remains still to be deduced as committed by the target processing circuitry.

* * * * *